United States Patent
Shirakawa et al.

(10) Patent No.: US 11,570,026 B2
(45) Date of Patent: Jan. 31, 2023

(54) COMMUNICATION APPARATUS AND COMMUNICATION METHOD

(71) Applicants: SHARP KABUSHIKI KAISHA, Sakai (JP); FG Innovation Company Limited, Tuen Mun (HK)

(72) Inventors: Atsushi Shirakawa, Sakai (JP); Ryota Yamada, Sakai (JP); Yasuhiro Hamaguchi, Sakai (JP); Kazuhiko Fukawa, Yokohama (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/418,485

(22) PCT Filed: Nov. 28, 2019

(86) PCT No.: PCT/JP2019/046559
§ 371 (c)(1),
(2) Date: Jun. 25, 2021

(87) PCT Pub. No.: WO2020/137337
PCT Pub. Date: Jul. 2, 2020

(65) Prior Publication Data
US 2022/0078055 A1    Mar. 10, 2022

(30) Foreign Application Priority Data

Dec. 26, 2018 (JP) .............................. JP2018-242660

(51) Int. Cl.
*H04L 27/06* (2006.01)
*H04B 7/06* (2006.01)
(Continued)

(52) U.S. Cl.
CPC ........... *H04L 27/06* (2013.01); *H04B 7/0613* (2013.01); *H04L 5/0048* (2013.01); *H04L 27/04* (2013.01); *H04W 72/0406* (2013.01)

(58) Field of Classification Search
CPC ..... H04B 7/0613; H04L 5/0048; H04L 27/04; H04L 27/06; H04W 12/00; H04W 72/0406
See application file for complete search history.

(56) References Cited

U.S. PATENT DOCUMENTS

| | | | | |
|---|---|---|---|---|
| 10,069,592 | B1 * | 9/2018 | Krunz | ...................... H04K 3/43 |
| 2015/0263852 | A1 * | 9/2015 | Alon | ..................... H04L 9/0618 |
| | | | | 380/28 |

(Continued)

FOREIGN PATENT DOCUMENTS

| JP | 2018-137702 A | | 8/2018 |
|---|---|---|---|
| JP | 2018137702 A | * | 8/2018 |

OTHER PUBLICATIONS

Tsuyoshi Yoneda et al., "Wireless Security Schemes using Random Phases for MIMO-OFDM Communications", Proceedings of the 2016 IEICE Society Conference 1, sections 1, 2, p. 341, Sep. 6, 2016, see International Search Report of PCT/JP2019/046559.

(Continued)

*Primary Examiner* — David B Lugo
(74) *Attorney, Agent, or Firm* — ScienBiziP, P.C.

(57) ABSTRACT

Provided are communication apparatus and a communication method that allow for secure communication even in a case that an eavesdropper has multiple antennas. An apparatus includes a transmitter configured to transmit a constant amplitude signal from three or more transmit antennas; a controller configured to control a phase of the constant amplitude signal, based on channel information and a target symbol; and a modulation unit configured to generate a (Continued)

modulation symbol from bits. The target symbol is generated by multiplying the modulation symbol by an amplitude coefficient.

12 Claims, 3 Drawing Sheets

(51) Int. Cl.
    *H04L 5/00*     (2006.01)
    *H04L 27/04*     (2006.01)
    *H04W 72/04*     (2009.01)

(56) References Cited

U.S. PATENT DOCUMENTS

2017/0026146 A1*   1/2017   Tollefson ............... H04K 3/825
2019/0229833 A1*   7/2019   Ha ..................... H04W 52/267

OTHER PUBLICATIONS

John E. Hershey, Amer A. Hassan, and Rao Yarlagadda, "Unconventional Cryptographic Keying Variable Management", IEEE Transactions on Communications, vol. 43, No. 1, Jan. 1995.

* cited by examiner

COMMUNICATION APPARATUS AND COMMUNICATION METHOD

CROSS-REFERENCE TO RELATED APPLICATION

The present application claims priority based on Japanese Patent Application No. 2018-242660 filed on Dec. 26, 2018, the content of which is incorporated herein by reference.

TECHNICAL FIELD

The present disclosure relates to a communication apparatus and a communication method.

BACKGROUND ART

Research and development activities related to the 5th generation mobile radio communication system (5G system) have been actively carried out, aiming to start commercial services around the year 2020. A vision recommendation on the standard system of the 5G system (International Mobile Telecommunication-2020 and beyond: IMT-2020) was recently reported (see NPL 1) by the International Telecommunication Union Radio communications Sector (ITU-R), which is an international standardization body.

It is considered that radio communication will become more and more important in the future, and accordingly the number of communication apparatuses will further increase as well. In this case, security may present a problem. Security is one of the most important technologies in a communication system. In general, for security, secure communication using encryption in the higher layer, rather than the physical layer, is used in many cases. However, since radio communication is transmitted in a wide range, an eavesdropper may be able to receive control information and the like that are not encrypted. In such a physical layer, physical layer security is present as a technology for implementing secure communication. As a physical layer security technology, for example, there is a technology in which artificial noise, which is rendered null for an authorized user and non-null for an eavesdropper, is added to a transmit signal for transmission. The artificial noise is a technology of enabling secure communication with channel information between a transmitter and an authorized user being used as a key, and making eavesdropping of an eavesdropper difficult. The physical layer security technology using the artificial noise is described in NPL 2.

CITATION LIST

Non Patent Literature

NPL 1: "IMT Vision—Framework and overall objectives of the future development of IMT for 2020 and beyond", Recommendation ITU-R M. 2083-0, September 2015.
NPL 2: S. Goel and R. Negi, "Guaranteeing secrecy using artificial noise", IEEE Trans. Wireless Commun. Vol. 7, No. 6, pp. 2180-2189, June 2008.

SUMMARY OF INVENTION

Technical Problem

However, in the method described in NPL 2, in a case that an eavesdropper has multiple antennas, there is a possibility that the eavesdropper statistically performs blind estimation for diversity combining weights including channel information, thus being able to extract an intended signal through diversity combining.

An aspect of the present invention is made in view of the circumstances as described above, and has an object to provide a communication apparatus and a communication method that allow for secure communication even in a case that an eavesdropper has multiple antennas.

Solution to Problem

In order to solve the problem described above, configurations of a communication apparatus and a communication method according to an aspect of the present invention are as follows.

A communication apparatus according to an aspect of the present invention includes: a transmitter configured to transmit a constant amplitude signal from three or more transmit antennas; a controller configured to control a phase of the constant amplitude signal based on channel information and a target symbol; and a modulation unit configured to generate a modulation symbol from bits. The target symbol is generated by multiplying the modulation symbol by an amplitude coefficient.

In the communication apparatus according to an aspect of the present invention, a target amplitude is selected according to at least a reference of the target amplitude, a unit of applying the target amplitude, or a timing of changing the target amplitude. The target amplitude is an amplitude of the target symbol.

In the communication apparatus according to an aspect of the present invention, the reference of the target amplitude is an amplitude of a demodulation reference signal.

In the communication apparatus according to an aspect of the present invention, the reference of the target amplitude is an amplitude of the modulation symbol.

In the communication apparatus according to an aspect of the present invention, the reference of the target amplitude is an amplitude of a reference resource element.

In the communication apparatus according to an aspect of the present invention, the unit of applying the target amplitude corresponds to one or multiple resource elements.

In the communication apparatus according to an aspect of the present invention, the unit of applying the target amplitude corresponds to one or multiple Orthogonal Frequency Division Multiplexing (OFDM) symbols.

In the communication apparatus according to an aspect of the present invention, the unit of applying the target amplitude corresponds to one or multiple resource blocks.

In the communication apparatus according to an aspect of the present invention, the timing of changing the target amplitude is periodic.

In the communication apparatus according to an aspect of the present invention, the timing of changing the target amplitude is aperiodic.

In the communication apparatus according to an aspect of the present invention, the communication apparatus transmits first control information. The first control information includes at least one of the reference of the target amplitude, the unit of applying the target amplitude, and the timing of changing the target amplitude.

In the communication apparatus according to an aspect of the present invention, the communication apparatus transmits second control information. The second control information includes a changing pattern including one or a plurality of the target amplitudes.

A communication apparatus according to an aspect of the present invention includes: a receiver configured to receive first control information and a target symbol; and a demodulation unit configured to demodulate the target symbol. A target amplitude is an amplitude of the target symbol. The first control information includes at least one of a reference of the target amplitude, a unit of applying the target amplitude, and a timing of changing the target amplitude. The target symbol is obtained by multiplying a modulation symbol generated from bits by the target amplitude. The target symbol received is demodulated based on the first control information.

In the communication apparatus according to an aspect of the present invention, the receiver receives second control information. The second control information includes a changing pattern including one or a plurality of the target amplitudes. The target symbol is demodulated based on the first control information and the second control information.

A communication method according to an aspect of the present invention includes: transmitting a constant amplitude signal from three or more transmit antennas; controlling a phase of the constant amplitude signal based on channel information and a target symbol; and generating a modulation symbol from bits. The target symbol is generated by multiplying the modulation symbol by an amplitude coefficient.

A communication method according to an aspect of the present invention includes: receiving first control information and a target symbol; and demodulating the target symbol. A target amplitude is an amplitude of the target symbol. The first control information includes at least one of a reference of the target amplitude, a unit of applying the target amplitude, and a timing of changing the target amplitude. The target symbol is obtained by multiplying a modulation symbol generated from bits by the target amplitude. The target symbol received is demodulated based on the first control information.

Advantageous Effects of Invention

According to an aspect of the present invention, signals subjected to phase control with channel information being used as a key are transmitted from each of the transmit antennas, and thus secure communication between a transmitter and an authorized user is enabled, and eavesdropping by an eavesdropper is made difficult. Further, by transmitting constant amplitude signals from each of the transmit antennas, a linear condition and a dynamic range condition required for an amplifier are eased, and thus there is an effect of power saving. By changing statistical properties of the intended signal in a short period, blind estimation for diversity combining weights for the eavesdropper to eavesdrop is made difficult, and thus more secure communication is enabled.

DESCRIPTION OF EMBODIMENTS

The communication system according to the present embodiment includes a base station apparatus (a transmitting apparatus, a cell, transmit point, a transmit antenna group, a transmit antenna port group, a component carrier, an eNodeB, a transmission point, a transmit and/or receive point, a transmission panel, an access point, a sub-array, a communication apparatus) and a terminal apparatus (a terminal, a mobile terminal, a receive point, a receiving terminal, a receiving apparatus, a receive antenna group, a receive antenna port group, a UE, a reception point, a reception panel, a station, a sub-array, a communication apparatus). Furthermore, a base station apparatus connected to a terminal apparatus (base station apparatus that has established a radio link with a terminal apparatus) is referred to as a serving cell. Note that, in the following embodiment, the term "communication apparatus" indicates a base station apparatus or a terminal apparatus.

The base station apparatus and the terminal apparatus in the present embodiment can communicate in a licensed band and/or an unlicensed band.

According to the present embodiments, "X/Y" includes the meaning of "X or Y". According to the present embodiments, "X/Y" includes the meaning of "X and Y". According to the present embodiments, "X/Y" includes the meaning of "X and/or Y".

Figure 1:
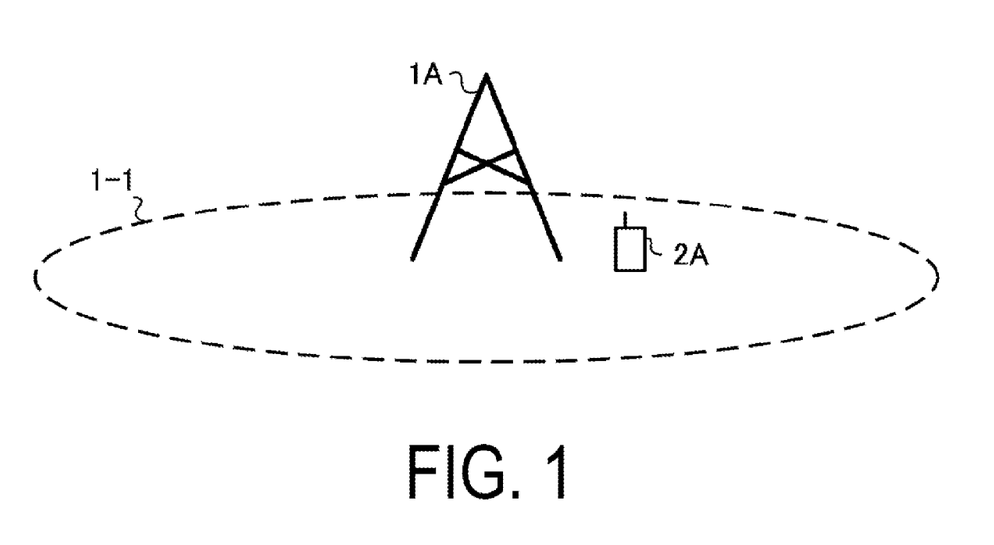
FIG. 1 is a diagram illustrating an example of a communication system according to the present embodiment.

FIG. 1 is a diagram illustrating an example of a communication system according to the present embodiment. As illustrated in FIG. 1, the communication system according to the present embodiment includes a base station apparatus 1A and a terminal apparatus 2A. Coverage 1-1 is a range (a communication area) in which the base station apparatus 1A can connect to the terminal apparatuses. Further, the base station apparatus 1A is also simply referred to as a base station apparatus. Further, the terminal apparatus 2A is also simply referred to as a terminal apparatus.

With respect to FIG. 1, the following uplink physical channels are used for uplink radio communication from the terminal apparatus 2A to the base station apparatus 1A. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is used to transmit Uplink Control Information (UCI). The Uplink Control Information includes a positive ACKnowledgement (ACK) or a Negative ACKnowledgement (NACK) (ACK/NACK) for downlink data (a downlink transport block or a Downlink-Shared Channel (DL-SCH)). ACK/NACK for the downlink data is also referred to as Hybrid Automatic Repeat reQuest-ACKnowledgement (HARQ-ACK) ( ) or HARQ feedback.

Here, the Uplink Control Information includes Channel State Information (CSI) for the downlink. The Uplink Control Information includes a Scheduling Request (SR) used to request an Uplink-Shared Channel (UL-SCH) resource. Examples of the channel state information include a Rank Indicator (RI) for specifying an appropriate spatial multiplexing number, a Precoding Matrix Indicator (PMI) for specifying an appropriate precoder, a Channel Quality Indicator (CQI) for specifying an appropriate transmission rate, a CSI Reference Signal (CSI-RS) Resource Indicator (CRI) indicating an appropriate CSI-RS resource, and Reference Signal Received Power (RSRP) measured by the CSI-RS or a Synchronization Signal (SS).

The Channel Quality Indicator (CQI) (hereinafter, referred to as a CQI value) can be an appropriate modulation scheme (e.g., Quadrature Phase-Shift Keying (QPSK), 16 Quadrature Amplitude Modulation (16QAM), 64QAM, 256QAM, or the like) and an appropriate coding rate in a prescribed band (details of which will be described later). The CQI value can be an index (CQI Index) determined by the above change scheme, coding rate, and the like. The CQI value can take a value predetermined in the system.

The CRI indicates a CSI-RS resource having appropriate received power/reception quality out of multiple CSI-RS resources.

Note that the Rank Indicator and the Precoding Quality Indicator can take the values predetermined in the system. The Rank Indicator and the Precoding Matrix Indicator can be an index determined by the number of spatial multiplexing and Precoding Matrix information. Note that a part or all of the CQI value, the PMI value, the RI value, and the CRI value are also collectively referred to as a CSI value.

PUSCH is used for transmission of uplink data (an uplink transport block, UL-SCH). Furthermore, PUSCH may be used for transmission of ACK/NACK and/or Channel State Information along with the uplink data. In addition, PUSCH may be used to transmit the uplink control information only.

PUSCH is used to transmit an RRC message. The RRC message is a signal/information that is processed in a Radio Resource Control (RRC) layer. Further, PUSCH is used to transmit a MAC Control Element (CE). Here, MAC CE is a signal/information that is processed (transmitted) in a Medium Access Control (MAC) layer.

For example, a power headroom may be included in MAC CE and may be reported via PUSCH. In other words, a MAC CE field may be used to indicate a level of the power headroom.

The PRACH is used to transmit a random access preamble.

In the uplink radio communication, an Uplink Reference Signal (UL RS) is used as an uplink physical signal. The uplink physical signal is not used for transmission of information output from higher layers, but is used by the physical layer. Here, the uplink reference signal includes a Demodulation Reference Signal (DMRS), a Sounding Reference Signal (SRS), and a Phase-Tracking Reference Signal (PT-RS).

The DMRS is associated with transmission of the PUSCH or the PUCCH. For example, the base station apparatus 1A uses DMRS in order to perform channel compensation of PUSCH or PUCCH. For example, the base station apparatus 1A uses SRS to measure an uplink channel state. Further, the SRS is used for measurement (sounding) of the uplink. Further, the PT-RS is used for compensating for phase noise. Note that the DMRS in the uplink is also referred to as an uplink DMRS.

In FIG. 1, the following downlink physical channels are used for the downlink radio communication from the base station apparatus 1A to the terminal apparatus 2A. The downlink physical channels are used for transmitting information output from the higher layer.

Physical Broadcast Channel (PBCH)
Physical Control Format Indicator Channel (PCFICH)
Physical Hybrid Automatic Repeat reQuest Indicator Channel (HARQ Indicator Channel) (PHICH)
Physical Downlink Control Channel (PDCCH)
Enhanced Physical Downlink Control Channel (EPDCCH)
Physical Downlink Shared Channel (PDSCH)

The PBCH is used for broadcasting a Master Information Block (MIB, a Broadcast Channel (BCH)) that is used commonly by the terminal apparatuses. PCFICH is used for transmission of information for indicating a region (e.g., the number of Orthogonal Frequency Division Multiplexing (OFDM) symbols) to be used for transmission of PDCCH. Note that the MIB is also referred to as minimum system information.

PHICH is used for transmission of ACK/NACK with respect to uplink data (a transport block, a codeword) received by the base station apparatus 1A. In other words, PHICH is used for transmission of a HARQ indicator (HARQ feedback) for indicating ACK/NACK with respect to the uplink data. Note that ACK/NACK is also called HARQ-ACK. The terminal apparatus 2A reports ACK/NACK having been received to a higher layer. ACK/NACK refers to ACK for indicating a successful reception, NACK for indicating an unsuccessful reception, and Discontinuous Transmission (DTX) for indicating that no corresponding data is present. In a case that PHICH for uplink data is not present, the terminal apparatus 2A reports ACK to a higher layer.

The PDCCH and the EPDCCH are used to transmit Downlink Control Information (DCI). Here, multiple DCI formats are defined for transmission of the downlink control information. To be more specific, a field for the downlink control information is defined in a DCI format and is mapped to information bits.

For example, as a DCI format for the downlink, DCI format 1A to be used for the scheduling of one PDSCH in one cell (transmission of a single downlink transport block) is defined.

For example, the DCI format for the downlink includes downlink control information such as information of PDSCH resource allocation, information of a Modulation and Coding Scheme (MCS) for PDSCH, and a TPC command for PUCCH. Here, the DCI format for the downlink is also referred to as downlink grant (or downlink assignment).

Furthermore, for example, as a DCI format for the uplink, DCI format 0 to be used for the scheduling of one PUSCH in one cell (transmission of a single uplink transport block) is defined.

For example, the DCI format for the uplink includes uplink control information such as information of PUSCH resource allocation, information of MCS for PUSCH, and a TPC command for PUSCH. Here, the DCI format for the uplink is also referred to as uplink grant (or uplink assignment).

Further, the DCI format for the uplink can be used for requesting (CSI request) channel state information (also referred to as channel state information (CSI), or reception quality information) in the downlink.

The DCI format for the uplink can be used for a configuration for indicating an uplink resource to which a channel state information report (CSI feedback report) is mapped, the CSI feedback report being fed back to the base station apparatus by the terminal apparatus. For example, the channel state information report can be used for a configuration for indicating an uplink resource that periodically reports channel state information (Periodic CSI). The channel state information report can be used for a mode configuration (CSI report mode) for periodically reporting the channel state information.

For example, the channel state information report can be used for a configuration for indicating an uplink resource that reports aperiodic channel state information (Aperiodic CSI). The channel state information report can be used for a mode configuration (CSI report mode) for aperiodically reporting the channel state information.

For example, the channel state information report can be used for a configuration indicating an uplink resource for reporting semi-persistent channel state information (semi-persistent CSI). The channel state information report can be used for a mode configuration (CSI report mode) for semi-persistently reporting channel state information. Note that the semi-persistent CSI report is a CSI report performed periodically in a period from activation with a higher layer signal or downlink control information to deactivation.

The DCI format for the uplink can be used for a configuration for indicating a type of the channel state information report that is fed back to the base station apparatus by the terminal apparatus. The type of the channel state information report includes wideband CSI (e.g., Wideband CQI), narrowband CSI (e.g., Subband CQI), and the like.

In a case that a PDSCH resource is scheduled in accordance with the downlink assignment, the terminal apparatus receives downlink data on the scheduled PDSCH. In a case that a PUSCH resource is scheduled in accordance with the uplink grant, the terminal apparatus transmits uplink data and/or uplink control information on the scheduled PUSCH.

The PDSCH is used to transmit the downlink data (the downlink transport block, DL-SCH). PDSCH is used to transmit a system information block type 1 (SIB 1) message. The system information block type 1 message is cell-specific information.

The PDSCH is used to transmit a system information message. The system information message includes a system information block X other than the system information block type 1. The system information message is cell-specific information.

PDSCH is used to transmit an RRC message. Here, the RRC message transmitted from the base station apparatus may be shared by multiple terminal apparatuses in a cell. The RRC message transmitted from the base station apparatus 1A may be a dedicated message to a given terminal apparatus 2A (also referred to as dedicated signaling). In other words, user equipment specific (user equipment unique) information is transmitted by using the message dedicated to the certain terminal apparatus. PDSCH is used to transmit MAC CE.

Here, the RRC message and/or MAC CE is also referred to as higher layer signaling.

PDSCH can be used to request downlink channel state information. PDSCH can be used for transmission of an uplink resource to which a channel state information report is mapped, the CSI feedback report being fed back to the base station apparatus by the terminal apparatus. For example, the channel state information report can be used for a configuration for indicating an uplink resource that periodically reports channel state information (Periodic CSI). The channel state information report can be used for a mode configuration (CSI report mode) for periodically reporting the channel state information.

The type of the downlink channel state information report includes wideband CSI (e.g., Wideband CSI) and narrowband CSI (e.g., Subband CSI). The wideband CSI calculates one piece of Channel State Information for the system band of a cell. The narrowband CSI divides the system band in prescribed units, and calculates one piece of Channel State Information for each division.

In the downlink radio communication, a Synchronization Signal (SS) and a Downlink Reference Signal (DL RS) are used as downlink physical signals. The downlink physical signals are not used for transmission of information output from the higher layers, but are used by the physical layer. Note that the synchronization signal includes a Primary Synchronization Signal (PSS) and a Secondary Synchronization Signal (SSS).

The synchronization signal is used for the terminal apparatus to take synchronization in the frequency domain and the time domain in the downlink. The synchronization signal is used to measure received power, reception quality, or a Signal-to-Interference and Noise power Ratio (SINR). Note that the received power measured with the synchronization signal is also referred to as Synchronization Signal-Reference Signal Received Power (SS-RSRP), the reception quality measured with the synchronization signal is also referred to as Reference Signal Received Quality (SS-RSRQ), and the SINR measured with the synchronization signal is also referred to as SS-SINR. Note that the SS-RSRQ is a ratio between the SS-RSRP and the RSSI. The Received Signal Strength Indicator (RSSI) is average received power of the total in a certain measurement period. The synchronization signal/downlink reference signal is used for the terminal apparatus to perform channel compensation on a downlink physical channel. For example, the synchronization signal/downlink reference signal is used for the terminal apparatus to calculate the downlink channel state information.

Here, the downlink reference signal includes a Demodulation Reference Signal (DMRS), a Non-Zero Power Channel State Information-Reference Signal (NZP CSI-RS), a Zero Power Channel State Information-Reference Signal (ZP CSI-RS), a PT-RS, and a Tracking Reference Signal (TRS). Note that the DMRS in the downlink is also referred to as a downlink DMRS. Note that, in the following embodiment, the term "CSI-RS" by itself includes the NZP CSI-RS and/or the ZP CSI-RS.

The DMRS is transmitted in a subframe and a band that are used for transmission of the PDSCH/PBCH/PDCCH/EPDCCH related to the DMRS, and is used for performing demodulation of the PDSCH/PBCH/PDCCH/EPDCCH related to the DMRS.

Here, the downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

BCH, UL-SCH, and DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing and the like are performed for each codeword.

Furthermore, for terminal apparatuses that support Carrier Aggregation (CA), the base station apparatus can integrate multiple Component Carriers (CCs) for transmission in a broader band to perform communication. In carrier aggregation, one Primary Cell (PCell) and one or more Secondary Cells (SCells) are configured as a set of serving cells.

Furthermore, in Dual Connectivity (DC), a Master Cell Group (MCG) and a Secondary Cell Group (SCG) are configured as a group of serving cells. MCG includes a PCell and optionally one or more SCells. Furthermore, SCG includes a primary SCell (PSCell) and optionally one or more SCells.

The base station apparatus can communicate by using a radio frame. The radio frame includes multiple subframes (sub-periods). In a case that a frame length is expressed in time, for example, a radio frame length can be 10 milliseconds (ms), and a subframe length can be 1 ms. In this example, the radio frame includes 10 subframes.

Further, a slot includes 14 OFDM symbols. An OFDM symbol length may vary depending on a subcarrier spacing, and a slot length may also vary depending on a subcarrier spacing. Further, a mini-slot includes less OFDM symbols than those included in the slot. The slot/mini-slot can be a scheduling unit. Note that the terminal apparatus can know slot-based scheduling/mini-slot-based scheduling by the position (mapping) of the first downlink DMRS. In the slot-based scheduling, the first downlink DMRS is mapped to the third or fourth symbol of the slot. Further, in the mini-slot-based scheduling, the first downlink DMRS is mapped to the first symbol of scheduled data (resource, PDSCH).

Further, the resource block is defined by 12 continuous subcarriers. Further, the resource element is defined by indexes (for example, subcarrier indexes) in the frequency domain and indexes (for example, OFDM symbol indexes) in the time domain. The resource element is categorized as an uplink resource element, a downlink resource element, a flexible resource element, and a reserved resource element. In the reserved resource element, the terminal apparatus does not transmit an uplink signal or does not receive a downlink signal.

Further, multiple SubCarrier Spacings (SCSs) are supported. For example, the SCSs are 15/30/60/120/240/480 kHz.

Figure 2:
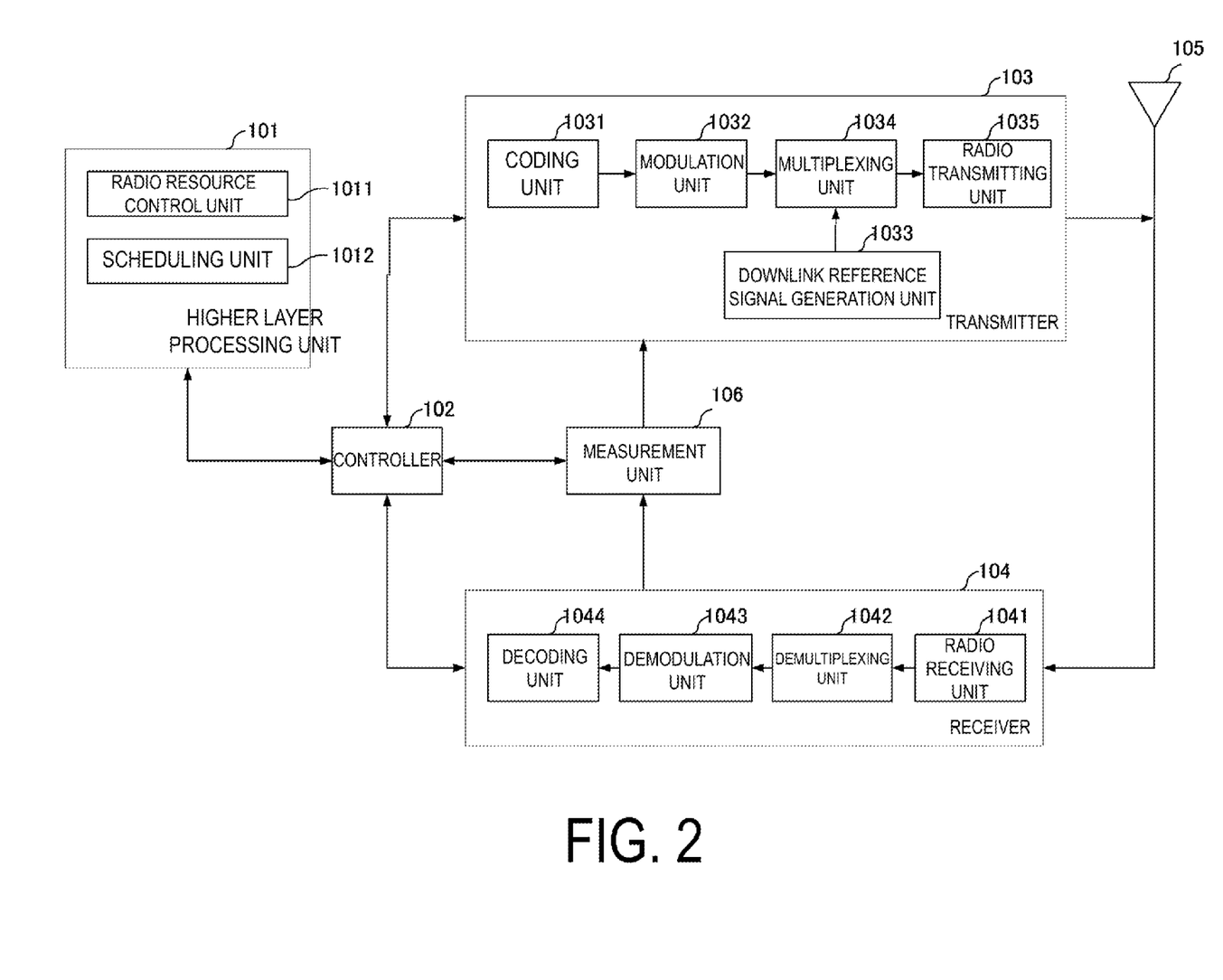
FIG. 2 is a block diagram illustrating a configuration example of a base station apparatus according to the present embodiment.

FIG. 2 is a schematic block diagram illustrating a configuration of the base station apparatus according to the present embodiment. As illustrated in FIG. 2, the base station apparatus includes a higher layer processing unit (higher layer processing step) 101, a controller (controlling step) 102, a transmitter (transmitting step) 103, a receiver (receiving step) 104, a transmit and/or receive antenna 105, and a measurement unit (measuring step) 106. The higher layer processing unit 101 includes a radio resource control unit (radio resource controlling step) 1011 and a scheduling unit (scheduling step) 1012. The transmitter 103 includes a coding unit (coding step) 1031, a modulation unit (modulating step) 1032, a downlink reference signal generation unit (downlink reference signal generating step) 1033, a multiplexing unit (multiplexing step) 1034, and a radio transmitting unit (radio transmitting step) 1035. The receiver 104 includes a radio receiving unit (radio receiving step) 1041, a demultiplexing unit (demultiplexing step) 1042, a demodulation unit (demodulating step) 1043, and a decoding unit (decoding step) 1044.

The higher layer processing unit 101 performs processing of a Medium Access Control (MAC) layer, a Packet Data Convergence Protocol (PDCP) layer, a Radio Link Control (RLC) layer, and a Radio Resource Control (RRC) layer. Furthermore, the higher layer processing unit 101 generates information necessary for control of the transmitter 103 and the receiver 104, and outputs the generated information to the controller 102.

The higher layer processing unit 101 receives information of a terminal apparatus, such as a capability of the terminal apparatus (UE capability), from the terminal apparatus. To rephrase, the terminal apparatus transmits its function to the base station apparatus by higher layer signaling.

Note that in the following description, information of a terminal apparatus includes information for indicating whether the terminal apparatus supports a prescribed function, or information for indicating that the terminal apparatus has completed the introduction and test of a prescribed function. In the following description, information of whether the prescribed function is supported includes information of whether the introduction and test of the prescribed function have been completed.

For example, in a case that a terminal apparatus supports a prescribed function, the terminal apparatus transmits information (parameters) for indicating whether the prescribed function is supported. In a case that a terminal apparatus does not support a prescribed function, the terminal apparatus does not transmit information (parameters) for indicating whether the prescribed function is supported. In other words, whether the prescribed function is supported is notified by whether information (parameters) for indicating whether the prescribed function is supported is transmitted. The information (parameters) for indicating whether the prescribed function is supported may be notified by using one bit of 1 or 0.

The radio resource control unit 1011 generates, or acquires from a higher node, the downlink data (the transport block) allocated in the downlink PDSCH, system information, the RRC message, the MAC Control Element (CE), and the like. The radio resource control unit 1011 outputs the downlink data to the transmitter 103, and outputs other information to the controller 102. Furthermore, the radio resource control unit 1011 manages various configuration information of the terminal apparatuses.

The scheduling unit 1012 determines a frequency and a slot to which the physical channels (PDSCH and PUSCH) are allocated, the coding rate and modulation scheme (or MCS) for the physical channels (PDSCH and PUSCH), the transmit power, and the like. The scheduling unit 1012 outputs the determined information to the controller 102.

The scheduling unit 1012 generates information to be used for scheduling the physical channels (PDSCH and PUSCH), based on the result of the scheduling. The scheduling unit 1012 outputs the generated information to the controller 102.

Based on the information input from the higher layer processing unit 101, the controller 102 generates a control signal for controlling the transmitter 103 and the receiver 104. The controller 102 generates the downlink control information based on the information input from the higher layer processing unit 101, and outputs the generated information to the transmitter 103.

The transmitter 103 generates the downlink reference signal in accordance with the control signal input from the controller 102, codes and modulates the HARQ indicator, the downlink control information, and the downlink data that are input from the higher layer processing unit 101, multiplexes PHICH, PDCCH, EPDCCH, PDSCH, and the downlink reference signal, and transmits a signal obtained through the multiplexing to the terminal apparatus 2A through the transmit and/or receive antenna 105.

The coding unit 1031 performs coding by using a predetermined coding scheme, such as block coding, convolutional coding, turbo coding, Low density parity check (LDPC) coding, and Polar coding, on a HARQ indicator, downlink control information, and downlink data that are input from the higher layer processing unit 101, or performs coding by using a coding scheme that is determined by the radio resource control unit 1011. The modulation unit 1032 modulates the coded bits input from the coding unit 1031, in compliance with the modulation scheme prescribed in advance, such as Binary Phase Shift Keying (BPSK), Quadrature Phase Shift Keying (QPSK), 16 Quadrature Amplitude Modulation (16QAM), 64QAM, or 256QAM, or in compliance with the modulation scheme determined by the radio resource control unit 1011.

The downlink reference signal generation unit 1033 generates, as the downlink reference signal, a sequence, known to the terminal apparatus 2A, that is determined in accordance with a rule predetermined based on the physical cell identity (PCI, cell ID) for identifying the base station apparatus 1A, and the like.

The multiplexing unit 1034 multiplexes the modulated modulation symbol of each channel, the generated downlink reference signal, and the downlink control information. To be more specific, the multiplexing unit 1034 maps the modulated modulation symbol of each channel, the generated downlink reference signal, and the downlink control information to the resource elements.

The radio transmitting unit 1035 performs Inverse Fast Fourier Transform (IFFT) on the modulation symbol resulting from the multiplexing or the like, generates an OFDM symbol, adds a cyclic prefix (CP) to the generated OFDM symbol, generates a baseband digital signal, converts the baseband digital signal into an analog signal, removes unnecessary frequency components through filtering, up-converts a result of the removal into a signal of a carrier frequency, performs power amplification, and outputs a final result to the transmit and/or receive antenna 105 for transmission.

In accordance with the control signal input from the controller 102, the receiver 104 demultiplexes, demodulates, and decodes the reception signal received from the terminal apparatus 2A through the transmit and/or receive antenna 105, and outputs information resulting from the decoding to the higher layer processing unit 101.

The radio receiving unit 1041 converts, by down-converting, an uplink signal received through the transmit and/or receive antenna 105 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 1041 removes a portion corresponding to CP from the digital signal resulting from the conversion. The radio receiving unit 1041 performs Fast Fourier Transform (FFT) of the signal from which the CP has been removed, extracts a signal in the frequency domain, and outputs the resulting signal to the demultiplexing unit 1042.

The demultiplexing unit 1042 demultiplexes the signal input from the radio receiving unit 1041 into signals such as PUCCH, PUSCH, and an uplink reference signal. The demultiplexing is performed based on radio resource allocation information, included in the uplink grant notified to each of the terminal apparatuses 2A, that is predetermined by the base station apparatus 1A by using the radio resource control unit 1011.

Furthermore, the demultiplexing unit 1042 performs channel compensation for PUCCH and PUSCH. The demultiplexing unit 1042 demultiplexes the uplink reference signal.

The demodulation unit 1043 performs Inverse Discrete Fourier Transform (IDFT) of PUSCH, acquires modulation symbols, and demodulates, for each of the modulation symbols of PUCCH and PUSCH, a reception signal in compliance with a predetermined modulation scheme, such as BPSK, QPSK, 16QAM, 64QAM, and 256QAM, or in compliance with a modulation scheme that the base station apparatus 1A notified to the terminal apparatuses 2A in advance by using the uplink grant.

The decoding unit 1044 decodes the coded bits of PUCCH and PUSCH that have been demodulated, at a coding rate in compliance with a predetermined coding scheme, that is predetermined or notified from the base station apparatus 1A to the terminal apparatus 2A in advance by using the uplink grant, and outputs the decoded uplink data and uplink control information to the higher layer processing unit 101. In a case that PUSCH is retransmitted, the decoding unit 1044 performs the decoding by using the coded bits that are input from the higher layer processing unit 101 and retained in a HARQ buffer, and the demodulated coded bits.

The measurement unit 106 measures the received signal, and calculates various measurement values such as the RSRP/RSRQ/RSSI. Further, the measurement unit 106 calculates the received power, the reception quality, and an appropriate SRS resource index, based on the SRS transmitted from the terminal apparatus.

Figure 3:
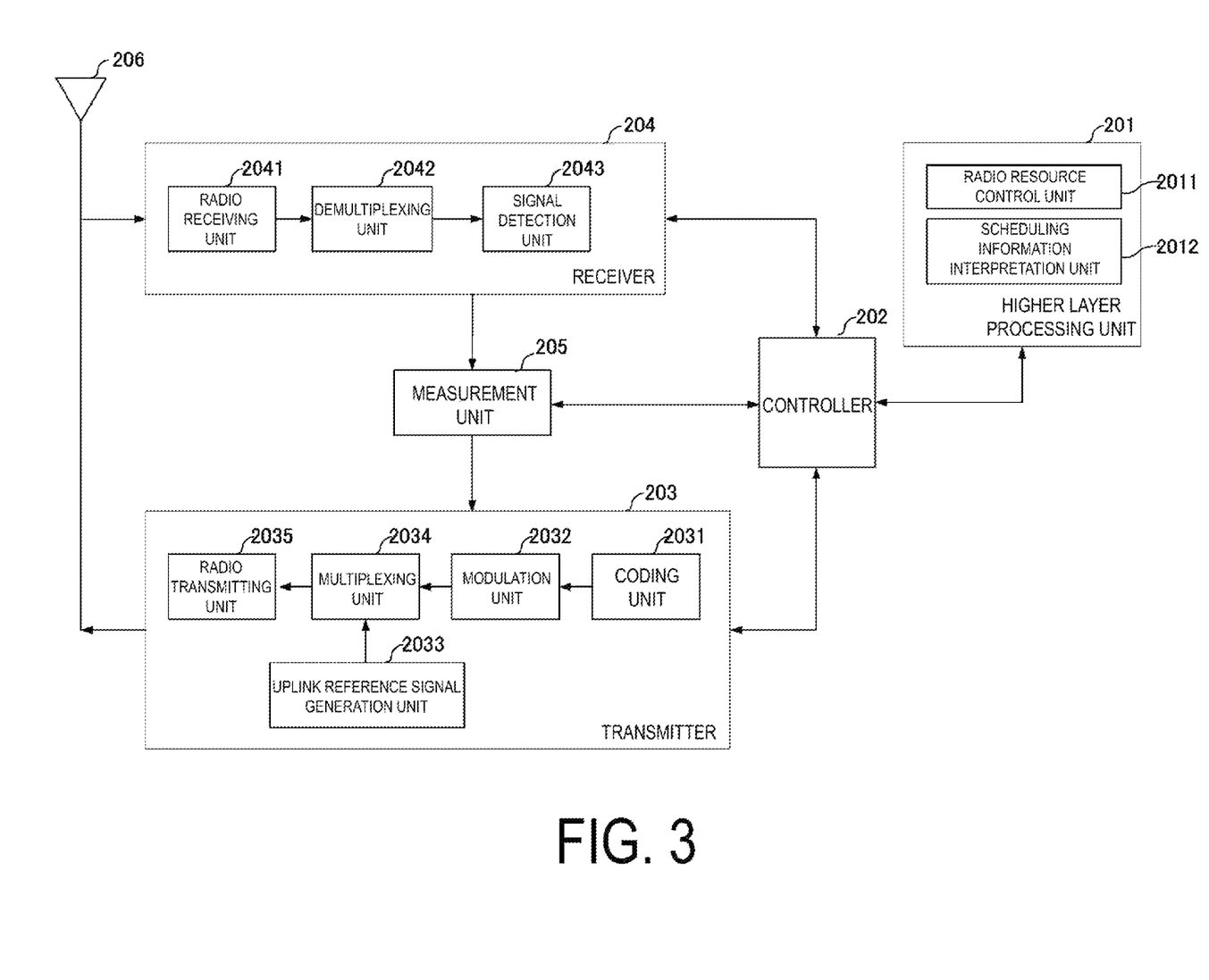
FIG. 3 is a block diagram illustrating a configuration example of a terminal apparatus according to the present embodiment.

FIG. 3 is a schematic block diagram illustrating a configuration of the terminal apparatus according to the present embodiment. As illustrated in FIG. 3, the terminal apparatus includes a higher layer processing unit (higher layer processing step) 201, a controller (controlling step) 202, a transmitter (transmitting step) 203, a receiver (receiving step) 204, a measurement unit (measuring step) 205, and a transmit and/or receive antenna 206. The higher layer processing unit 201 includes a radio resource control unit (radio resource controlling stop) 2011 and a scheduling information interpretation unit (scheduling information interpreting step) 2012. The transmitter 203 includes a coding unit (coding step) 2031, a modulation unit (modulating step) 2032, an uplink reference signal generation unit (uplink reference signal generating step) 2033, a multiplexing unit (multiplexing step) 2034, and a radio transmitting unit (radio transmitting step) 2035. The receiver 204 includes a radio receiving unit (radio receiving step) 2041, a demultiplexing unit (demultiplexing step) 2042, and a signal detection unit (signal detecting step) 2043.

The higher layer processing unit 201 outputs, to the transmitter 203, the uplink data (the transport block) generated by a user operation or the like. The higher layer processing unit 201 performs processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs, to the transmitter 203, information for indicating a terminal apparatus function supported by the terminal apparatus 2A.

Furthermore, the radio resource control unit 2011 manages various configuration information of the terminal apparatus 2A. Furthermore, the radio resource control unit 2011 generates information to be mapped to each uplink channel, and outputs the generated information to the transmitter 203.

The radio resource control unit 2011 acquires configuration information transmitted from the base station apparatus, and outputs the configuration information to the controller 202.

The scheduling information interpretation unit 2012 interprets the downlink control information received through the receiver 204, and determines scheduling information. The scheduling information interpretation unit 2012 generates control information in order to control the receiver 204 and the transmitter 203 in accordance with the scheduling information, and outputs the generated information to the controller 202.

The controller 202 generates a control signal for performing control of the receiver 204, the measurement unit 205, and the transmitter 203, based on information input from the higher layer processing unit 201. The controller 202 outputs the generated control signal to the receiver 204, the measurement unit 205, and the transmitter 203, and performs control of the receiver 204 and the transmitter 203.

The controller 202 controls the transmitter 203 so that the measurement unit 205 transmits the generated CSI/RSRP/RSRQ/RSSI to the base station apparatus.

In accordance with the control signal input from the controller 202, the receiver 204 demultiplexes, demodulates, and decodes a reception signal received from the base station apparatus through the transmit and/or receive antenna 206, and outputs the resulting information to the higher layer processing unit 201.

The radio receiving unit 2041 converts, by down-converting, a downlink signal received through the transmit and/or receive antenna 206 into a baseband signal, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiving unit 2041 removes a portion corresponding to CP from the digital signal resulting from the conversion, performs fast Fourier transform of the signal from which the CP has been removed, and extracts a signal in the frequency domain.

The demultiplexing unit 2042 demultiplexes the extracted signal into PHICH, PDCCH, EPDCCH, PDSCH, and the downlink reference signal. Furthermore, the demultiplexing unit 2042 performs channel compensation for PHICH, PDCCH, and EPDCCH based on a channel estimation value of a desired signal obtained from channel measurement, detects downlink control information, and outputs the detected downlink control information to the controller 202. The controller 202 outputs PDSCH and the channel estimation value of the desired signal to the signal detection unit 2043.

The signal detection unit 2043 performs demodulation and decoding by using the PDSCH and the channel estimation value, and outputs the resultants to the higher layer processing unit 201.

The measurement unit 205 performs various measurements such as CSI measurement, Radio Resource Management (RRM) measurement, and Radio Link Monitoring (RLM) measurement, and calculates the CSI/RSRP/RSRQ/RSSI and the like.

The transmitter 203 generates an uplink reference signal in accordance with the control signal input from the controller 202, codes and modulates the uplink data (the transport block) input from the higher layer processing unit 201, multiplexes PUCCH, PUSCH, and the generated uplink reference signal, and transmits a signal resulting from the multiplexing to the base station apparatus through the transmit and/or receive antenna 206.

The coding unit 2031 performs coding such as convolutional coding, block coding, turbo coding, LDPC coding, and Polar coding on the uplink control information or the uplink data input from the higher layer processing unit 201.

The modulation unit 2032 modulates the coded bits input from the coding unit 2031, in compliance with a modulation scheme, such as BPSK, QPSK, 16QAM, or 64QAM, that is notified by using the downlink control information, or in compliance with a modulation scheme predetermined for each channel.

The uplink reference signal generation unit 2033 generates a sequence acquired according to a prescribed rule (formula), based on a physical cell identity (PCI, also referred to as a Cell ID or the like) for identifying the base station apparatus, a bandwidth to which the uplink reference signal is mapped, a cyclic shift notified with the uplink grant, a parameter value for generation of a DMRS sequence, and the like.

The multiplexing unit 2034 multiplexes PUCCH and PUSCH signals and the generated uplink reference signal for each transmit antenna port. To be more specific, the multiplexing unit 2034 maps the PUCCH and PUSCH signals and the generated uplink reference signal to resource elements for each transmit antenna port.

The radio transmitting unit 2035 performs Inverse Fast Fourier Transform (IFFT) on a signal resulting from the multiplexing, performs the modulation of an OFDM scheme, generates an OFDMA symbol, adds CP to the generated OFDMA symbol, generates a baseband digital signal, converts the baseband digital signal into an analog signal, removes unnecessary frequency components, up-converts a result of the removal into a signal of a carrier frequency, performs power amplification, and outputs a final result to the transmit and/or receive antenna 206 for transmission.

Note that the terminal apparatus can perform modulation of not only the OFDMA scheme but the SC-FDMA (DFT-spread-OFDM) scheme.

In particular, in a radio communication system, it is one of the most important things to securely communicate with a communication partner without having information leak to entities other than the communication partner. In order to maintain secure communication, encryption by the higher layer is generally performed. In order to further enhance security, it is desirable that security measures be taken in the physical layer as well.

In radio communication, transmit signals reach in a wide range, and thus it is possible that an eavesdropper (unauthorized user) receives radio signals. In a case that unencrypted control information or the like leaks, the eavesdropper is more likely to be able to perform demodulation and decoding. Thus, in the physical layer, by making it difficult for the eavesdropper to perform demodulation and decoding, secure communication can be performed.

For example, the communication apparatus is capable of transmitting an intended signal of an authorized user and a signal referred to as artificial noise from multiple transmit antennas (also referred to as an artificial noise method). In a case that a channel with a communication partner is known, the artificial noise can be controlled so as to be null for the authorized user. On the other hand, for an unauthorized user, the artificial noise does not become null but deteriorates communication quality, and so demodulation and decoding are difficult.

The communication apparatus is capable of transmitting the intended signal with random phase and amplitude from each of the multiple transmit antennas so that the authorized user can correctly receive the intended signal and the unauthorized user cannot correctly receive the intended signal (also referred to as a random phase method). Provided that amplitude is calculated so that the transmit power is reduced, secure communication can be performed with transmit power being reduced.

Note that, in the artificial noise method and the random phase method, in a case that the eavesdropper has multiple antennas, the eavesdropper is able to extract the intended signal provided that diversity combining weights are estimated through blind estimation. Thus, in order to enhance security, it is desirable to make blind estimation of the eavesdropper difficult.

In blind estimation, parameters are estimated on the assumption that statistical properties of the intended signal are not changed in a certain measurement period. Thus, by changing the statistical properties of the intended signal in a period shorter than the measurement period of blind estimation, the blind estimation of the eavesdropper can be made difficult.

In a case that amplitude is calculated so that the transmit power is reduced as described above, amplitudes of signals transmitted from the respective transmit antennas basically differ from each other and are not constant. In other words, as an example, there is great diversity as in a case that amplitude of a signal transmitted from one transmit antenna is small, amplitude of a signal transmitted from another transmit antenna is large, and amplitude of a signal transmitted from yet another transmit antenna is yet larger. In this case, an amplifier of a transmitter is required to have high performance, such as assurance of linearity over a wide dynamic range or the like, and thus power consumption is increased, and the price is also high.

Provided that the intended signal can be transmitted with constant amplitude from each of the transmit antennas by controlling only the phase, the linear property condition required for the amplifier is eased, and secure communication can be performed also with reduced power consumption. Therefore, a determination method of the phase that meets this requirement will be described.

For example, the following assumes radio communication between a transmission station (for example, downlink base station apparatus, uplink terminal apparatus) including a transmit antenna and a reception station (for example, downlink terminal apparatus, uplink base station apparatus) including a receive antenna for receiving a signal from the transmission station.

The number of transmit antennas of the transmission station is represented by K ($\geq 3$), and channel information (e.g., impulse response, frequency response) between the k-th ($1 \leq k \leq K$) transmit antenna and the receive antenna of the reception station is represented by $h_k$. The transmit signal of the k-th transmit antenna is represented by $A \exp(j\theta_k)$. Note that j is an imaginary number unit, and A is a positive constant representing a transmit power amplitude coefficient. $\theta_k$ is phase to be controlled. Further, exp( ) represents an exponential function. In addition, a received symbol in the receive antenna of the reception station is represented by $Ar \exp(j\Phi)$. Ar is a positive number representing reception amplitude, and $\Phi$ is the phase of the received symbol. Note that $r \exp(j\Phi)$ is also referred to as a target symbol.

Expression 1

$$\sum_{k=1}^{K} h_k A \exp(j\theta_k) = Ar\exp(j\phi) \qquad (1)$$

$$\sum_{k=1}^{K} h_k \exp(j\theta_k) = r\exp(j\phi)$$

The transmission station configures a target symbol corresponding to the received symbol and channel information acquired from the measurement unit, for the controller, and determines an amplitude coefficient r and a phase $\theta_k$ so that the received symbol in the reception station becomes $r \exp(j\Phi)$. In a case that channel information is known or can be accurately estimated, the target symbol in the transmission station and the received symbol in the reception station match each other.

An amplitude coefficient r will be described. The received symbol is represented by $r \exp(j\Phi)$. First, in a case of QPSK, $\exp(j\Phi)$ represents a modulation symbol of QSPK of average power of 1, and the amplitude coefficient r is a scaling coefficient for scaling up/down modulation mapping of QPSK. Note that modulation mapping represents mapping from a bit sequence to the modulation symbol with average power of 1. The modulation symbol represents a complex symbol that can be obtained through modulation mapping. Next, in a case of amplitude modulation such as 16QAM, 64QAM, or 256QAM, amplitude of the modulation symbol varies depending on a bit sequence. In other words, in this case, the amplitude coefficient r includes both the amplitude of the modulation symbol and the scaling coefficient for scaling up/down modulation mapping.

In contrast, the received symbol can be represented as $ra \exp(j\Phi)$, with a representing the amplitude of the modulation symbol. Note that a=1 in a case of QPSK and is an amplitude of the complex symbol that can be obtained through modulation mapping in a case of 16QAM, 64QAM, or 256QAM. In this case, the amplitude coefficient r represents a scaling coefficient for scaling up/down modulation mapping.

Provided that phase $\theta_k$ ($1 \leq k \leq K$) can be determined so that Equation (1) is satisfied, by applying phase rotation $\theta_k$ ($1 \leq k \leq K$) to each of the constant amplitude signals transmitted from each of the transmit antennas, the authorized user can receive the intended signal.

First, two of phase $\theta_k$ ($1 \leq k \leq K$) are reserved, and the rest is randomly determined. For example, the following will describe a case that phase other than that having antenna numbers k=1 and k=2 is randomly determined. However, the antenna numbers are not limited to this combination and may be any two numbers. Alternatively, two antennas may be selected based on a prescribed pattern.

Expression 2

$$\sum_{L=1}^{2} h_k \exp(j\theta_k) = r\exp(j\phi) - \sum_{k=\lambda}^{K} h_k \exp(j\theta_k) \qquad (2)$$

$$= r'\exp(j\phi')$$

Equation (1) is deformed into Equation (2). Note that r' and $\Phi$' are a positive number and a real number representing amplitude and phase, respectively.

Expression 3

$$\theta_1 = \phi' - \psi_1 + \arccos\left(\frac{|h_1|^2 + r'^2|h_2|^2}{2|h_1|r'}\right) \qquad (3)$$

$$\theta_2 = \phi' \ \psi_2 \cdot \arccos\left(\frac{|h_2|^2 + r'^2|h_1|^2}{2|h_2|r'}\right) \qquad (4)$$

By obtaining $\theta_1$ and $\theta_2$ so that Equation (2) is satisfied, for example, Equations (3) and (4) are obtained. Note that $\Psi_k$ is a real number representing phase of $h_k$ (k=1, 2). Arccos( ) is an inverse function of a cosine function.

In this manner, by applying $\theta_1$ and $\theta_2$ and phase rotation of randomly determined phase $\theta_k$ (k>2) to each of the constant amplitude signals transmitted from the respective transmit antennas, the authorized user can receive the intended signal. In contrast, the unauthorized user basically does not know channel information between the transmit antenna of the transmission station and the receive antenna of the authorized user, and thus has difficulty in eavesdropping. Note that this method is also referred to as a constant amplitude random phase method.

Amplitude of the target symbol is referred to as target amplitude. Information related to target amplitude is transmitted from the transmission station to the reception station as control information, and demodulation in the reception station is thereby efficiently performed. For example, a reference of the target amplitude, a unit of applying the target amplitude, a timing of changing the target amplitude, and a changing pattern of the target amplitude (this may be one target amplitude, or may be a changing pattern for configuring from multiple target amplitudes) are effective as the control information.

Examples of a transmission means of the control information include signalling such as RRC through the higher layer and signalling such as DCI/UCI through the lower layer. For example, the reference of the target amplitude, the unit of applying the target amplitude, and the timing of changing the target amplitude, which are assumed not to have immediacy, are signaled through the higher layer, whereas the changing pattern of the target amplitude, which is assumed to have immediacy, is signaled through the lower layer. As a matter of course, a signalling means of each piece of the control information is not limited to the examples described above. The reference of the target amplitude, the unit of applying the target amplitude, and the timing of changing the target amplitude may be signaled through the lower layer, and the changing pattern of the target amplitude may be signaled through the higher layer. Note that the control information signaled through the higher layer is also referred to as first control information. Note that the control information signaled through the lower layer is also referred to as second control information.

In a case that eavesdropping through blind estimation of the unauthorized user is not taken into consideration, the transmission station need not change statistical properties of the intended signal. In a case that the modulation scheme is phase modulation such as QPSK, basically, the target amplitude is constant, and therefore, the amplitude coefficient to be selected may be uniquely selected as well. Because of phase modulation, the reception station need not determine the amplitude of the received symbol, and only needs to be able to determine phase.

In contrast, in a case that the modulation scheme is amplitude modulation or phase amplitude modulation such as Amplitude Shift Keying (ASK), 16QAM, 64QAM, or 256QAM, the transmission station needs to select the amplitude coefficient so as to obtain the target amplitude according to the target symbol. In this case, by providing the reference of the target amplitude, accuracy (reliability) of determination of the amplitude in the reception station is enhanced. The reference of the target amplitude may be, for example, amplitude of the demodulation reference signal, or may be amplitude of another downlink reference signal and an uplink reference signal, or amplitude of a signal transmitted in a certain resource element. In a similar concept, original amplitude of the modulation symbol (an amplitude value in a case that the amplitude coefficient is not multiplied, an amplitude value of modulation mapping) may be used as the reference. Note that, similarly to a case that the modulation scheme described above is phase modulation, determination of phase in the reception station can be performed even in a case that there is no reference value of the target amplitude.

In a case that eavesdropping through blind estimation of the unauthorized user is taken into consideration, by changing statistical properties of the intended signal in a period shorter than the measurement period in which blind estimation is converged, the blind estimation can be made difficult, and furthermore, the eavesdropping can be made difficult. The change of the statistical properties of the intended signal can be, for example, performed by the transmission station, causing the target amplitude to depend on the time/frequency for change. With change timing information of the target amplitude included in the control information described above, whether the change is periodically executed according to a prescribed value or the change is aperiodically executed may be reported.

The prescribed value in the above paragraph may be specified as time/frequency in the change timing information, or may be in accordance with the unit of applying the target amplitude included in the control information. Examples of the application unit include one or multiple resource elements (e.g., subcarriers, modulation symbols), one or multiple OFDM symbols, one or multiple resource blocks, one or multiple slots, and the like. Basically, the change timing can be most finely configured in a case that a resource element unit is adopted, and granularity of the change timing becomes coarser in order of a resource block unit and an OFDM symbol unit.

In the changing pattern of the target amplitude, in some cases only one target amplitude is included, and in other cases the changing pattern including multiple target amplitudes is included. In the former case, control information signalling is necessary every time the target amplitude is changed, whereas the latter case serves to reduce the frequency of control signal signalling by combining the multiple target amplitudes into one.

Note that the changing pattern of the target amplitude may be a candidate value for changing the target amplitude. In this case, the reception station can perform blind detection and demodulation for one appropriate candidate value out of the candidate values of the target amplitude. Note that, in a case that the changing pattern of the target amplitude does not include the candidate values indicating the original amplitude of the modulation symbol (e.g., an amplitude value in a case that the amplitude coefficient is not multiplied, an amplitude value of modulation mapping), the reception station can perform blind detection and demodulation for the original amplitude of the modulation symbol as well as the candidate values of the target amplitude.

According to the present embodiment, by transmitting the intended signal by controlling only the phase with constant amplitude from each of the transmit antennas, the linearity required for the amplifier is eased, and the authorized user can securely receive the intended signal also with reduced power consumption.

According to the present embodiment, by changing the statistical properties of the intended signal in a short period, blind estimation of the eavesdropper is made difficult, and therefore secure communication can be performed. Further, by changing the statistical properties of the intended signal in a short period for the artificial noise method, the random phase method, and the constant amplitude random phase method, further secure communication can be performed.

Note that the frequency band used by the communication apparatus (e.g., base station apparatus, terminal apparatus) according to the present embodiment is not limited to the licensed band and the unlicensed band described above. The frequency bands as a target of the present embodiment include a frequency band (for example, a frequency band that is allocated for television broadcasting but is not used depending on a region) referred to as a white band (white space), which is not used in actuality with the intention of avoiding interference between frequencies or the like, despite the fact that use permission for a specific service is granted from a nation or a region. The frequency bands as a target of the present embodiment also include a common frequency band (licensed common band), which has been exclusively allocated to a specific operator so far but is expected to be shared by multiple operators in future.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to an aspect of the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

The present invention is preferably used in a communication apparatus and a communication method.

The invention claimed is:

1. A communication apparatus, comprising:
a receiver configured to receive first control information, second control information, and a target symbol; and
a demodulator configured to demodulate the target symbol, wherein:
at least one target amplitude is an amplitude of the target symbol,
the first control information includes at least one of a reference of the at least one target amplitude, a unit of applying the at least one target amplitude, and a timing of changing the at least one target amplitude,
the second control information includes a changing pattern including the at least one target amplitude,
the target symbol is obtained by multiplying a modulation symbol generated from bits by the at least one target amplitude, and
the received target symbol is demodulated based on the first control information and the second control information.

2. The communication apparatus according to claim 1, wherein:
the at least one target amplitude is selected according to at least the reference of the at least one target amplitude, the unit of applying the at least one target amplitude, or the timing of changing the at least one target amplitude.

3. The communication apparatus according to claim 1, wherein the reference of the at least one target amplitude is an amplitude of a demodulation reference signal.

4. The communication apparatus according to claim 1, wherein the reference of the at least one target amplitude is an amplitude of the modulation symbol.

5. The communication apparatus according to claim 1, wherein the reference of the at least one target amplitude is an amplitude of a reference resource element.

6. The communication apparatus according to claim 1, wherein the unit of applying the at least one target amplitude corresponds to one or multiple resource elements.

7. The communication apparatus according to claim 1, wherein the unit of applying the at least one target amplitude corresponds to one or multiple Orthogonal Frequency Division Multiplexing (OFDM) symbols.

8. The communication apparatus according to claim 1, wherein the unit of applying the at least one target amplitude corresponds to one or multiple resource blocks.

9. The communication apparatus according to claim 1, wherein the timing of changing the at least one target amplitude is periodic.

10. The communication apparatus according to claim 1, wherein the timing of changing the at least one target amplitude is aperiodic.

11. The communication apparatus according to claim 1, wherein:
the first control information includes one of the at least one target amplitude, or a changing pattern that includes one or more of the at least one target amplitude.

12. A communication method, comprising:
receiving first control information, second control information, and a target symbol; and
demodulating the target symbol, wherein:
at least one target amplitude is an amplitude of the target symbol,
the first control information includes at least one of a reference of the at least one target amplitude, a unit of applying the at least one target amplitude, and a timing of changing the at least one target amplitude,
the second control information includes a changing pattern including the at least one target amplitude,
the target symbol is obtained by multiplying a modulation symbol generated from bits by the at least one target amplitude, and
the target received symbol is demodulated based on the first control information and the second control information.

* * * * *